United States Patent
Liu et al.

(10) Patent No.: US 9,684,420 B2
(45) Date of Patent: Jun. 20, 2017

(54) TOUCH SUBSTRATE, ITS MANUFACTURING METHOD AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yingming Liu, Beijing (CN); Xue Dong, Beijing (CN); Haisheng Wang, Beijing (CN); Weijie Zhao, Beijing (CN); Xiaoliang Ding, Beijing (CN); Shengji Yang, Beijing (CN); Hongjuan Liu, Beijing (CN); Changfeng Li, Beijing (CN); Lei Wang, Beijing (CN); Rui Xu, Beijing (CN); Dong Yang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 25 days.

(21) Appl. No.: 14/802,154

(22) Filed: Jul. 17, 2015

(65) Prior Publication Data
US 2016/0209951 A1    Jul. 21, 2016

(30) Foreign Application Priority Data
Jan. 19, 2015    (CN) .......................... 2015 1 0025729

(51) Int. Cl.
*G06F 3/044*    (2006.01)

(52) U.S. Cl.
CPC .... *G06F 3/044* (2013.01); *G06F 2203/04103* (2013.01)

(58) Field of Classification Search
CPC ........... G06F 3/044; G06F 2203/04103; G06F 2203/04111; G02F 1/13338
See application file for complete search history.

(56) References Cited

U.S. PATENT DOCUMENTS

| | | | | |
|---|---|---|---|---|
| 6,307,166 | B1* | 10/2001 | Watanabe | G06F 3/045 178/18.03 |
| 2012/0127387 | A1* | 5/2012 | Yamato | G06F 3/044 349/42 |

(Continued)

FOREIGN PATENT DOCUMENTS

| | | |
|---|---|---|
| CN | 202533920 U | 11/2012 |
| CN | 103713762 A | 4/2014 |

(Continued)

OTHER PUBLICATIONS

First Office Action regarding Chinese application No. 201510025729.9, dated Feb. 3, 2017. Translation provided by Dragon Intellectual Property Law Firm.

*Primary Examiner* — Abbas Abdulselam
(74) *Attorney, Agent, or Firm* — Harness, Dickey & Pierce, P.L.C.

(57) ABSTRACT

A self-capacitive touch panel includes a plurality of touch electrodes and a plurality of driving signal transmission lines corresponding to the touch electrodes. A plurality of via-holes is arranged at an identical amount and in an identical manner at a region where each touch electrode is located, and each driving signal transmission line is connected to the corresponding touch electrode through the via-hole. Projections of the via-holes at the regions where the touch electrodes other than the corresponding touch electrode are (Continued)

located in a direction perpendicular to the substrate are not located on the driving signal transmission line.

13 Claims, 6 Drawing Sheets

(56) References Cited

U.S. PATENT DOCUMENTS

2014/0168536 A1* 6/2014 Guo .................. G06F 3/044
  349/12
2016/0062164 A1* 3/2016 Chae ................ G02F 1/13338
  349/12

FOREIGN PATENT DOCUMENTS

| CN | 103793120 A | 5/2014 |
| CN | 104020893 A | 9/2014 |
| CN | 104049800 A | 9/2014 |
| CN | 104102402 A | 10/2014 |
| CN | 104216564 A | 12/2014 |

* cited by examiner

TOUCH SUBSTRATE, ITS MANUFACTURING METHOD AND DISPLAY DEVICE

CROSS-REFERENCE TO RELATED APPLICATION

The present application claims a priority of the Chinese patent application No. 201510025729.9 filed on Jan. 19, 2015, which is incorporated herein by reference in its entirety.

TECHNICAL FIELD

The present disclosure relates to the field of touch display, in particular to a touch substrate, its manufacturing method and a display device.

BACKGROUND

Along with the rapid development of the display technology, touch panel has been widely used in our lives. Currently, depending on its structure, the touch panel may include an add-on touch panel, an on-cell touch panel, and an in-cell touch panel. For the add-on touch panel, it is manufactured independently of a liquid crystal display (LCD), and then they are adhered together to form the LCD with a touch function, so the add-on touch panel has such drawbacks as high manufacture cost, low light transmittance and a thick module. For the in-cell touch panel, its touch electrodes are built in the liquid crystal display, so as to reduce a thickness of the entire module as well as the manufacture cost of the touch panel, thus it has been favored by the manufacturers.

An existing capacitive in-cell touch panel includes a mutual-capacitive touch panel and a self-capacitive touch panel. For the mutual-capacitive touch panel, a plurality of driving electrodes (Tx) and a plurality of sensing electrodes (Rx) are arranged in a crisscross manner in the touch panel, and capacitance is formed at a location where the driving electrode and the sensing electrode in different layers cross each other. A driving signal TX is applied to the driving electrodes in a scanning manner, and a corresponding sensing signal is generated by the sensing electrodes. When a touch has been made, a human body or a stylus gets close to a touch region, so as to affect the capacitance between the electrodes at this region and lead to a change in the sensing signal generated by the sensing electrode, thereby it is able to determine a touch position. For the self-capacitive touch panel, the driving electrode (Tx) and the sensing electrode (Rx) are an identical electrode, i.e., a touch electrode. The driving signal TX may be applied to the touch electrode, and the touch electrode may receive a feedback signal by itself. When no touch is made by a finger, a capacitance of the touch electrode is of a constant value A, and when the touch is made by the finger, the capacitance of the touch electrode is a sum of a finger capacitance and the initial capacitance A. Different sensing signals are generated depending on different capacitances, so it is able to determine a touch position.

In order to prevent the display from being adversely affected by the electrodes, generally the driving electrodes and the sensing electrodes are made of a transparent conductive material, e.g., indium tin oxide (ITO). For the self-capacitive touch panel, each touch electrode is connected to a driver circuit/detection circuit via a driving signal transmission line. In order to ensure a touch effect, the driving signal transmission line is made of a low-resistance metal material. The touch electrode and the driving signal transmission line are arranged at different layers, so the touch electrode is connected to the driving signal transmission line through a via-hole. As shown in FIG. 1, taking a condition where thee touch electrodes 1 are arranged in one column as an example, the driving signal transmission line 2 is connected to the corresponding touch electrode 1. In order to reduce the resistance of the touch electrode 1, a plurality of via-holes 3 is arranged at a region where the touch electrodes 1 are located, and the via-holes 3 are connected to each other via a conductive connection line 4.

In order to prevent the driving signal transmission line 2 from being connected to the touch electrodes other than the corresponding touch electrode 1, no via-hole is provided at a position corresponding to the driving signal transmission line 3 at a region where the touch electrodes other than the corresponding touch electrode Tare located. As shown in FIG. 1, a minimum of via-holes 3 are arranged at an undermost region where the touch electrode is located. In other words, the via-holes are distributed irregularly at the regions where different touch electrodes are located, which thus results in differences between pixels, e.g., different aperture ratios, different light diffraction efficiencies, and different electric fields. As a result, uneven display of the display panel will occur and a resultant display effect will be adversely affected.

SUMMARY

An object of the present disclosure is to provide a touch substrate, its manufacturing method and a display device, so as to provide even display, thereby to ensure a display effect of the display panel.

In one aspect, the present disclosure provides in one embodiment a self-capacitive touch substrate, including a plurality of touch electrodes and a plurality of driving signal transmission lines corresponding to the touch electrodes. A plurality of via-holes is arranged at an identical amount and in an identical manner at a region where each touch electrode is located, and each driving signal transmission line is connected to the corresponding touch electrode through the via-hole. Projections of the via-holes at the regions where the touch electrodes other than the corresponding touch electrode are located in a direction perpendicular to the substrate are not located on the driving signal transmission line.

Further, the region where each touch electrode is located is provided with a plurality of via-holes arranged in a matrix form. The driving signal transmission line includes a first line connected to the corresponding touch electrode through the via-holes arranged in a column, a second line arranged parallel to the first line and connected to a driving circuit, and a third line connecting the first line and the second line. The other via-holes in each column at the region where the corresponding electrode is located are connected to each other via a conductive connection line, the third line does not intersect any conductive connection line on the substrate, and the second line is located between two conductive connection lines at adjacent columns. Further, the second line is separated from the two conductive connection lines at an equal distance.

Further, the region where each touch electrode is located is provided with a plurality of via-holes arranged in a matrix form. The driving signal transmission line includes a first line connected to the corresponding touch electrode through the via-holes in one row, a second line arranged parallel to the first line and connected to a driving circuit, and a third line connecting the first line and the second line. The other via-holes in each row at the region where the corresponding touch electrode is located are connected to each other via a conductive connection line, the third line does not intersect any conductive connection line on the substrate, and the second line is located between two conductive connection lines at adjacent rows. Further, the second line is separated from the two conductive connection lines at an equal distance.

In another aspect, the present disclosure provides in one embodiment a mutual-capacitive touch substrate, including a plurality of driving electrodes and a plurality of driving signal transmission lines corresponding to the touch electrodes. The mutual-capacitive touch substrate further includes a plurality of common electrodes arrange at an identical layer with the driving electrodes. A plurality of via-holes is arranged at an identical amount and in an identical manner at a region where each driving electrode or each common electrode is located, and each driving signal transmission line is connected to the corresponding driving electrode through the via-hole. Projections of the via-holes at the regions where the common electrode is located in a direction perpendicular to the substrate are not located on the driving signal transmission line.

In another aspect, the present disclosure provides a display device including the above-mentioned self-capacitive touch substrate.

In yet another aspect, the present disclosure provides a display device including the above-mentioned mutual-capacitive touch substrate.

In yet another aspect, the present disclosure provides in one embodiment a method for manufacturing a self-capacitive touch substrate. The self-capacitive touch substrate includes a plurality of touch electrodes and a plurality of driving signal transmission lines corresponding to the touch electrodes. The method includes steps of:

forming the driving signal transmission lines and conductive connection lines on the substrate with thin film transistors (TFTs);

forming a passivation layer including a region where the plurality of touch electrodes is located on the substrate with the driving signal transmission lines and the conductive connection lines, the region where each touch electrode is located being provided with a plurality of via-holes arranged at an identical amount and in an identical manner; and forming at the passivation layer a touch electrode corresponding to the region where the touch electrode is located, each driving signal transmission line being connected to the corresponding touch electrode through the via-hole, and projections of the via-holes at the region where the touch electrodes other than the corresponding touch electrode are located in a direction perpendicular to the substrate being not located on the driving signal transmission line.

Further, the region where each touch electrode is located is provided with a plurality of via-holes arranged in a matrix form.

The step of forming the driving signal transmission lines and the conductive connection lines includes forming the driving signal transmission line including a first line connected to the corresponding touch electrode through the via-holes in one column, a second line arranged parallel to the first line and connected to a driving circuit, and a third line connecting the first line and the second line, and forming the conductive connection line connecting the other via-holes in each column at the region where the corresponding touch electrode is located, the third line not intersecting any conductive connection line on the substrate, and the second line being located between two conductive connection lines at adjacent columns.

Further, the step of forming the second line includes forming the second line separated from the two conductive connection lines at an equal distance.

Further, the step of forming the driving signal transmission lines and the conductive connection lines includes forming the driving signal transmission line including a first line connected to the corresponding touch electrode through the via-holes in one row, a second line arranged parallel to the first line and connected to a driving circuit, and a third line connecting the first line and the second line, and forming the conductive connection line connecting the other via-holes in each row at the region where the corresponding touch electrode is located, the third line not intersecting any conductive connection line on the substrate, and the second line being located between two conductive connection lines at adjacent rows.

Further, the step of forming the second line includes forming the second line separated from the two conductive connection lines at an equal distance.

According to the embodiments of the present disclosure, the region where each touch electrode is located is provided with the plurality of via-holes arranged at an identical amount and in an identical manner, and each driving signal transmission line is connected to the corresponding touch electrode through the via-hole. In addition, the projections of the via-holes at the region where the touch electrodes other than the corresponding touch electrode are located in the direction perpendicular to the substrate are not located on the driving signal transmission line. As a result, it is able to enable the region where each touch electrode is located to be provided with the plurality of via-holes arranged at an identical amount and in an identical manner in the case that the driving signal transmission line is not connected to the touch electrodes other than the corresponding touch electrode, and to reduce differences between the pixels, thereby to provide even display and ensure a display effect of a display panel.

DETAILED DESCRIPTION

Figure 1:
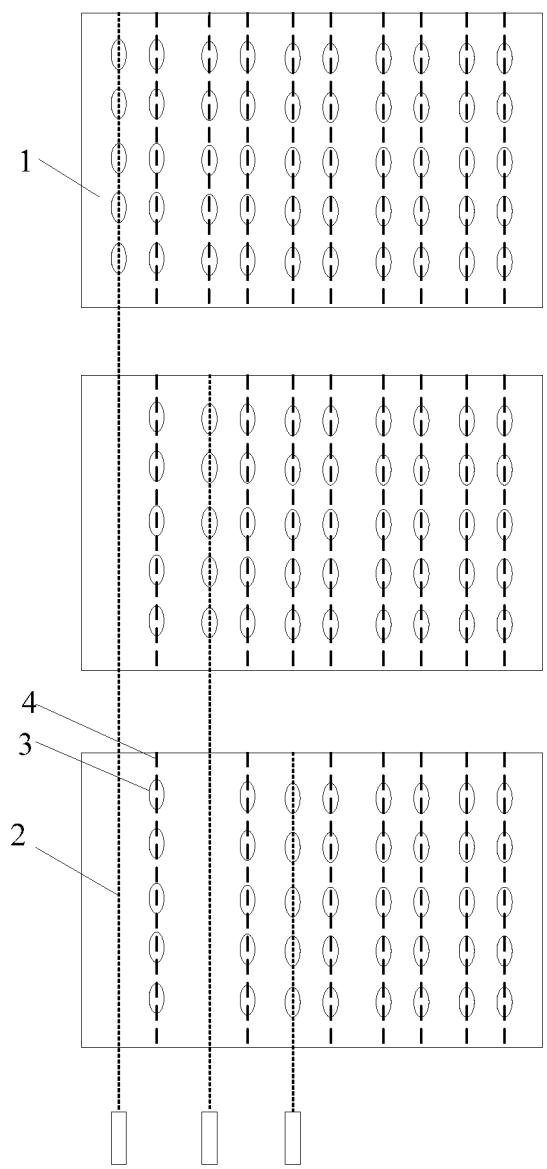
FIG. 1 is a schematic view showing the distribution of via-holes at a region where a touch electrode is located for an existing self-capacitive touch substrate.

In order to make the objects, the technical solutions and the advantages of the present disclosure more apparent, the present disclosure will be described hereinafter in conjunction with the drawings and embodiments.

In the related art, via-holes are distributed irregularly at different regions where touch electrodes are located, and different touch electrodes have different resistances. As a result, uneven display of a display panel will occur and a resultant display effect will be adversely affected. In order overcome this drawback, the present disclosure provides in the embodiments a touch substrate, its manufacturing method and a display device, so as to provide even display and ensure a display effect of a display panel.

First Embodiment

The present disclosure provides in this embodiment a self-capacitive touch substrate, which includes a plurality of touch electrodes and a plurality of driving signal transmission lines corresponding to the touch electrodes. A plurality of via-holes is arranged at an identical amount and in an identical manner at a region where each touch electrode is located, and each driving signal transmission line is connected to the corresponding touch electrode through the via-hole. Projections of the via-holes at the regions where the touch electrodes other than the corresponding touch electrode are located in a direction perpendicular to the substrate does not overlap the driving signal transmission line.

According to the touch substrate in this embodiment, the region where each touch electrode is located is provided with the plurality of via-holes arranged at an identical amount and in an identical manner, and each driving signal transmission line is connected to the corresponding touch electrode through the via-hole. In addition, the projections of the via-holes at the region where the touch electrodes other than the corresponding touch electrode are located in the direction perpendicular to the substrate are not located on the driving signal transmission line. As a result, it is able to enable the region where each touch electrode is located to be provided with the plurality of via-holes arranged at an identical amount and in an identical manner in the case that the driving signal transmission line is not connected to the touch electrodes other than the corresponding touch electrode, and to reduce differences between the pixels, thereby to provide the even display and ensure the display effect of a display panel.

In an alternative embodiment, the region where each touch electrode is located is provided with a plurality of via-holes arranged in a matrix form. The driving signal transmission line includes a first line connected to the corresponding touch electrode through the via-holes arranged in a column, a second line arranged parallel to the first line and connected to a driving circuit, and a third line connecting the first line and the second line. The other via-holes in each column at the region where the corresponding electrode is located are connected to each other via a conductive connection line, the third line does not intersect any conductive connection line on the substrate, and the second line is located between two conductive connection lines at adjacent columns.

Alternatively, the second line is separated from the two conductive connection lines at an equal distance.

In another alternative embodiment, the region where each touch electrode is located is provided with a plurality of via-holes arranged in a matrix form. The driving signal transmission line includes a first line connected to the corresponding touch electrode through the via-holes in one row, a second line arranged parallel to the first line and connected to the driving circuit, and a third line connecting the first line and the second line. The other via-holes in each row at the region where the corresponding touch electrode is located are connected to each other via a conductive connection line, the third line does not intersect any conductive connection line on the substrate, and the second line is located between two conductive connection lines at adjacent rows.

Alternatively, the second line is separated from the two conductive connection lines at an equal distance.

Further, when the touch substrate is a mutual-capacitive one, the mutual-capacitive touch substrate includes a plurality of driving electrodes and a plurality of driving signal transmission lines corresponding to the touch electrodes. The mutual-capacitive touch substrate further includes a plurality of common electrodes arrange at an identical layer with the driving electrodes. A plurality of via-holes is arranged at an identical amount and in an identical manner at a region where each driving electrode or each common electrode is located, and each driving signal transmission line is connected to the corresponding driving electrode through the via-hole. Projections of the via-holes at the regions where the common electrode is located in a direction perpendicular to the substrate are not located on the driving signal transmission line.

Second Embodiment

The present disclosure provides in this embodiment a display device including the above-mentioned touch substrate. The display device may be any product or member having a display function, e.g., a liquid crystal TV, a liquid crystal display, a digital photo frame, an organic light-emitting diode (OLED) panel, a mobile phone and a tablet PC.

Third Embodiment

The present disclosure provides in this embodiment a method for manufacturing the self-capacitive touch substrate. The self-capacitive touch substrate includes the plurality of touch electrodes and the plurality of driving signal transmission lines corresponding to the touch electrodes. The method includes steps of:
  forming the driving signal transmission lines and conductive connection lines on the substrate with TFTs;
  forming a passivation layer including regions where the plurality of touch electrodes is located on the substrate with the driving signal transmission lines and the conductive connection lines, the region where each touch electrode is located being provided with a plurality of via-holes arranged at an identical amount and in an identical manner; and
  forming at the passivation layer the touch electrode corresponding to the region where the touch electrode is located, each driving signal transmission line being connected to the corresponding touch electrode through the via-hole, and the protections of the via-holes at the region where the touch electrodes other than the corresponding touch electrode are located in the direction perpendicular to the substrate being not located on the driving signal transmission line.

According to the method in this embodiment, the region where each touch electrode is located is provided with the plurality of via-holes arranged at an identical amount and in an identical manner, and each driving signal transmission line is connected to the corresponding touch electrode through the via-hole. In addition, the projections of the via-holes at the region where the touch electrodes other than the corresponding touch electrode are located in the direction perpendicular to the substrate are not located on the driving signal transmission line. As a result, it is able to enable the region where each touch electrode is located to be provided with the plurality of via-holes arranged at an identical amount and in an identical manner in the case that the driving signal transmission line is not connected to the touch electrodes other than the corresponding touch electrode, and to reduce differences between the pixels, thereby to provide the even display and ensure the display effect of a display panel.

In an alternative embodiment, the region where each touch electrode is located is provided with a plurality of via-holes arranged in a matrix form.

The step of forming the driving signal transmission lines and the conductive connection lines includes forming the driving signal transmission line including a first line connected to the corresponding touch electrode through the via-holes in one column, a second line arranged parallel to the first line and connected to the driving circuit, and a third line connecting the first line and the second line, and forming the conductive connection line connecting the other via-holes in each column at the region where the corresponding touch electrode is located, the third line not intersecting any conductive connection line on the substrate, and the second line being located between two conductive connection lines at adjacent columns.

Alternatively, the step of forming the second line includes forming the second line separated from the two conductive connection lines at an equal distance.

In another alternative embodiment, the step of forming the driving signal transmission lines and the conductive connection lines includes forming the driving signal transmission line including a first line connected to the corresponding touch electrode through the via-holes in one row, a second line arranged parallel to the first line and connected to the driving circuit, and a third line connecting the first line and the second line, and forming the conductive connection line connecting the other via-holes in each row at the region where the corresponding touch electrode is located, the third line not intersecting any conductive connection line on the substrate, and the second line being located between two conductive connection lines at adjacent rows.

Alternatively, the step of forming the second line includes forming the second line separated from the two conductive connection lines at an equal distance.

Fourth Embodiment

Figure 5A:
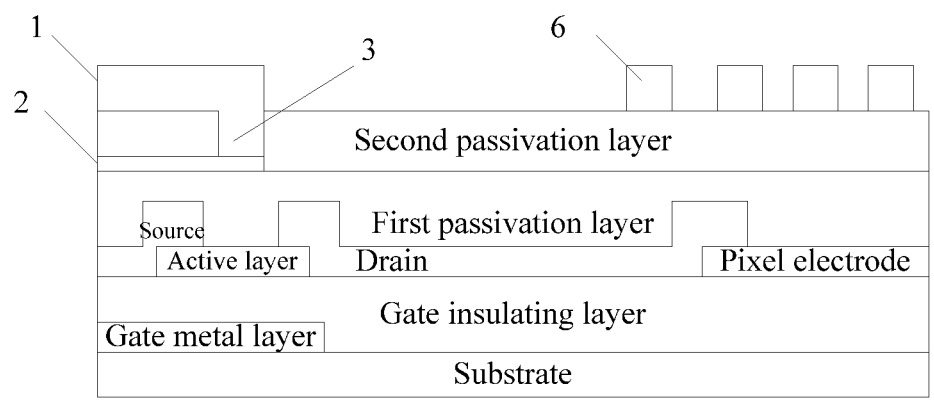
FIGS. 5A and 5B are sectional views of the touch substrate.

FIG. 1 shows an existing self-capacitive touch substrate. Taking a condition where three touch electrodes 1 are arranged in a column as an example, a driving signal transmission line 2 is connected to a corresponding touch electrode 1. In order to reduce a resistance of the touch electrode 1, a plurality of via-holes 3 is provided at regions where the touch electrodes 1 are located, and the via-holes 3 at the region where each touch electrode 1 is located are connected to each other via a conductive connection line 4. As shown in FIG. 5A, generally the touch electrode 1 and a common electrode 6 are located at an identical layer and made of a transparent conductive layer, and the driving signal transmission line 2 and the conductive connection line are located at an identical layer and made of a low-resistance metal. Because the conductive connection line is located at a layer identical to the driving signal transmission line, no via-hole is provided at the region where the other touch electrodes are located at a position corresponding to the driving signal transmission line 2, so as to prevent the driving signal transmission line 2 from being connected to the touch electrodes other than the corresponding touch electrode 1 via the conductive connection line. As shown in FIG. 1, a minimum number of via-holes 3 are arranged at an undermost region where the touch electrode is located. In other words, the via-holes are distributed irregularly at the regions where different touch electrodes are located, which thus results in differences between pixels, e.g., different aperture ratios, different light diffraction efficiencies, and different electric fields. As a result, uneven display of the display panel will occur and a resultant display effect will be adversely affected.

Figure 2:
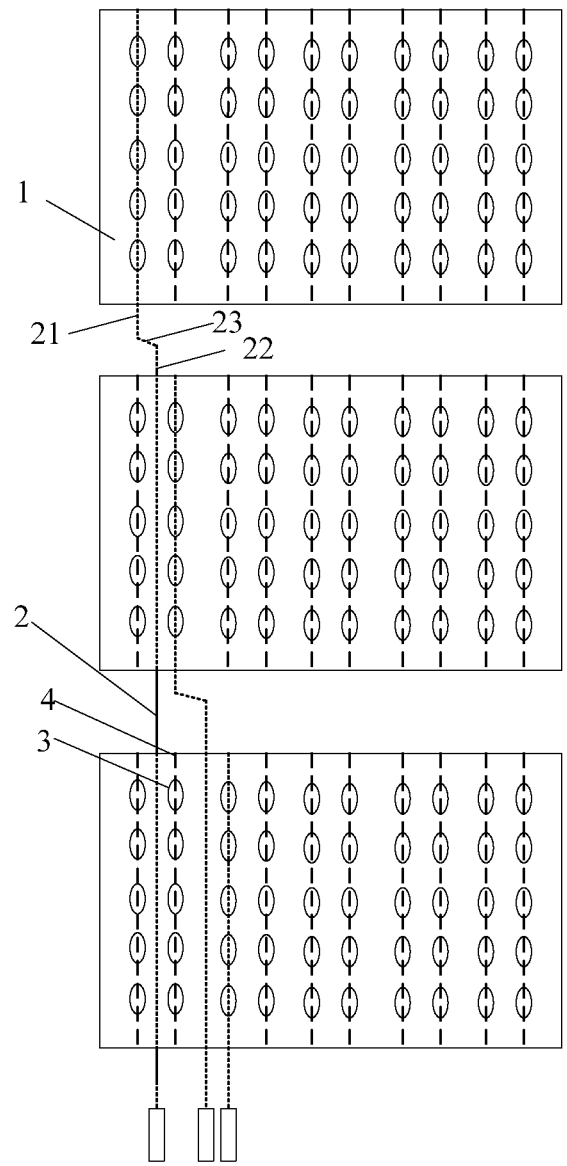
FIG. 2 is a schematic view showing the distribution of via-holes at a region where the touch electrode is located for a touch substrate according to one embodiment of the present disclosure.

In order to overcome the above-mentioned drawback, the present disclosure provides in this embodiment a self-capacitive touch substrate which includes, as shown in FIG. 2, a plurality of touch electrodes and a plurality of driving signal transmission lines corresponding to the plurality of touch electrodes. A region where each touch electrode is located is provided with a plurality of via-holes 3 arranged in a matrix form, at an identical amount and in an identical manner. Each driving signal transmission line 2 includes a first line 21 connected to the corresponding touch electrode 1 through the via-holes in one column, a second line 22 arranged parallel to the first line 21 and connected to a driving circuit, and a third line 23 connecting the first line 21 and the second line 22. As shown in FIG. 2, the other via-holes in each column at the region where the corresponding touch electrode 1 is located are connected to each other via a conductive connection line 4, so as to reduce the resistance of the touch electrode 1. It can be seen that, the third line 23 is located between two adjacent touch electrodes and does not intersect any conductive connection line 4 on the substrate, and the second line 22 is located between two conductive connection lines at adjacent columns. Alternatively, the second line is located exactly between the two conductive connection lines at adjacent columns, and separated from the two conductive connection lines at an equal distance. In this way, it is able to ensure that the second line does not intersect any conductive connection line, thereby to ensure that the driving signal transmission line is not electrically connected to the other touch electrodes at a region other than the region where the corresponding touch electrode is located.

To be specific, 2m conductive connection lines may be arranged at the region where each touch electrode is located. Among them, the first, third, . . . , and $(2m-1)^{th}$ conductive connection lines are the same as the existing conductive connection lines, i.e., the via-holes in one column are connected to each other via each of these conductive connection lines. The second, fourth, . . . , and $(2m)^{th}$ conductive connection lines are not connected to the via-holes and may serve as second lines of the driving signal transmission lines. In this way, for the touch electrodes in one column, the second line of the driving signal transmission line corresponding to the first touch electrode is just the second conductive connection line of the second touch electrode, the second line of the driving signal transmission line corresponding to the second touch electrode is just the fourth conductive connection line of the third touch electrode, and so on.

According to the touch substrate in this embodiment of the present disclosure, by changing the layout of the driving signal transmission lines, it is able to enable the region where each touch electrode is located to be provided with the plurality of via-holes arranged at an identical amount and in an identical manner in the case that the driving signal transmission line is not connected to the touch electrodes other than the corresponding touch electrode, and to reduce differences between the pixels, thereby to provide the even display and ensure the display effect of a display panel.

Figure 6:
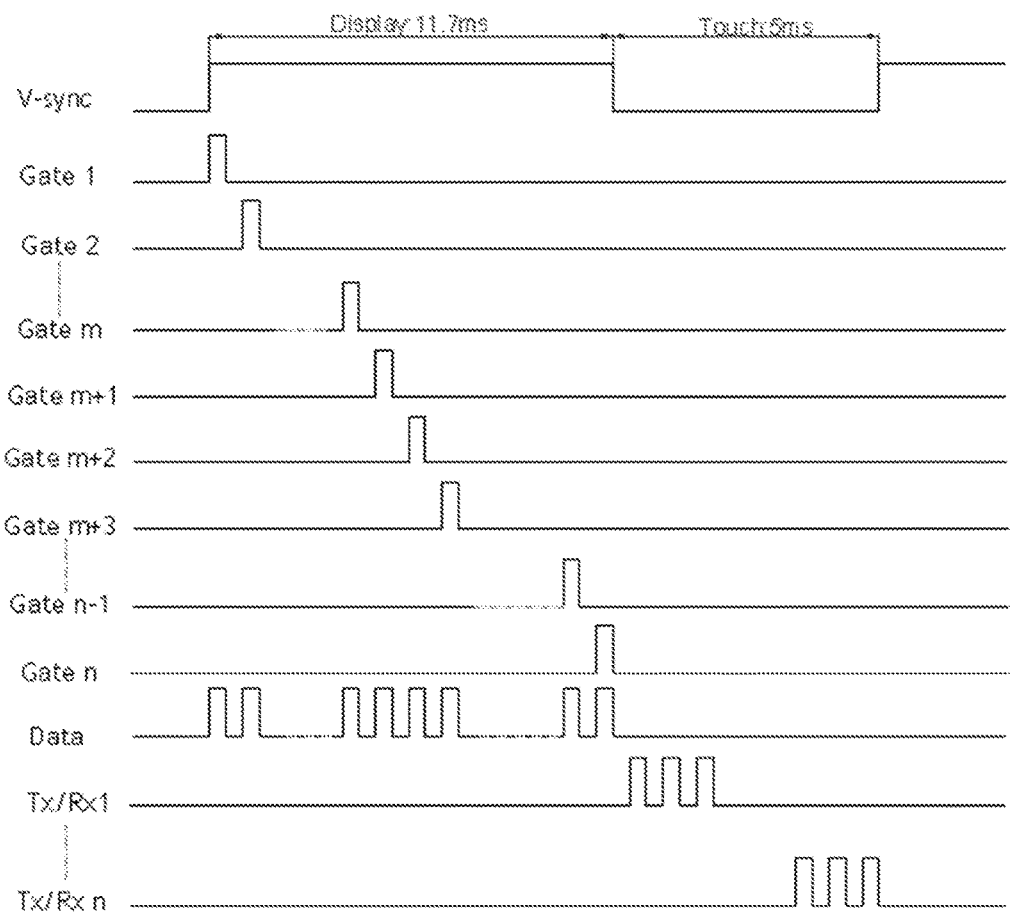
FIGS. 6 and 7 are sequence diagrams of the touch substrate driven in a time-division manner according to one embodiment of the present disclosure.

As shown in FIG. 6, the touch substrate in this embodiment may be driven in a time-division manner. A time period for displaying each frame (V-sync) by the touch panel is divided into a display period and a touch period. For example, in the sequence diagram as shown in FIG. 6, the time period for display one frame by the touch panel is 16.7 ms, the touch period includes 5 ms, and the display period includes 11.7 ms. Of course, the durations of the touch period and the display period may be adjusted appropriately in accordance with the processing capacity of an IC chip, which are not particularly defined herein. At the display period, a gate scanning signal is applied sequentially to gate signal lines Gate 1, Gate 2, . . . , and Gate n within the touch panel, and a grayscale signal is applied to a data signal line Data. At this time, the touch electrode serves as the common electrode, to which a constant common electrode signal is applied by the IC chip connected to the touch electrode, so as to achieve a display function. At the touch period, touch scanning signals T1, T2, . . . , and Tn are applied to the touch electrodes by the IC chip connected to the touch electrodes, and meanwhile, the touch electrodes detect touch sensing signals R1, R2, . . . , and Rn, so as to achieve a touch function. At the touch period, no signal is inputted into each gate signal line and the data signal line within the touch panel.

In addition, at the display period and the touch period, the common electrode signal is always applied to the common electrodes at a common electrode layer. Alternatively, at the display period the common electrode signal is applied to the common electrodes, and at the touch period the common electrodes are grounded or in a floating state where no signal is inputted.

Figure 7:
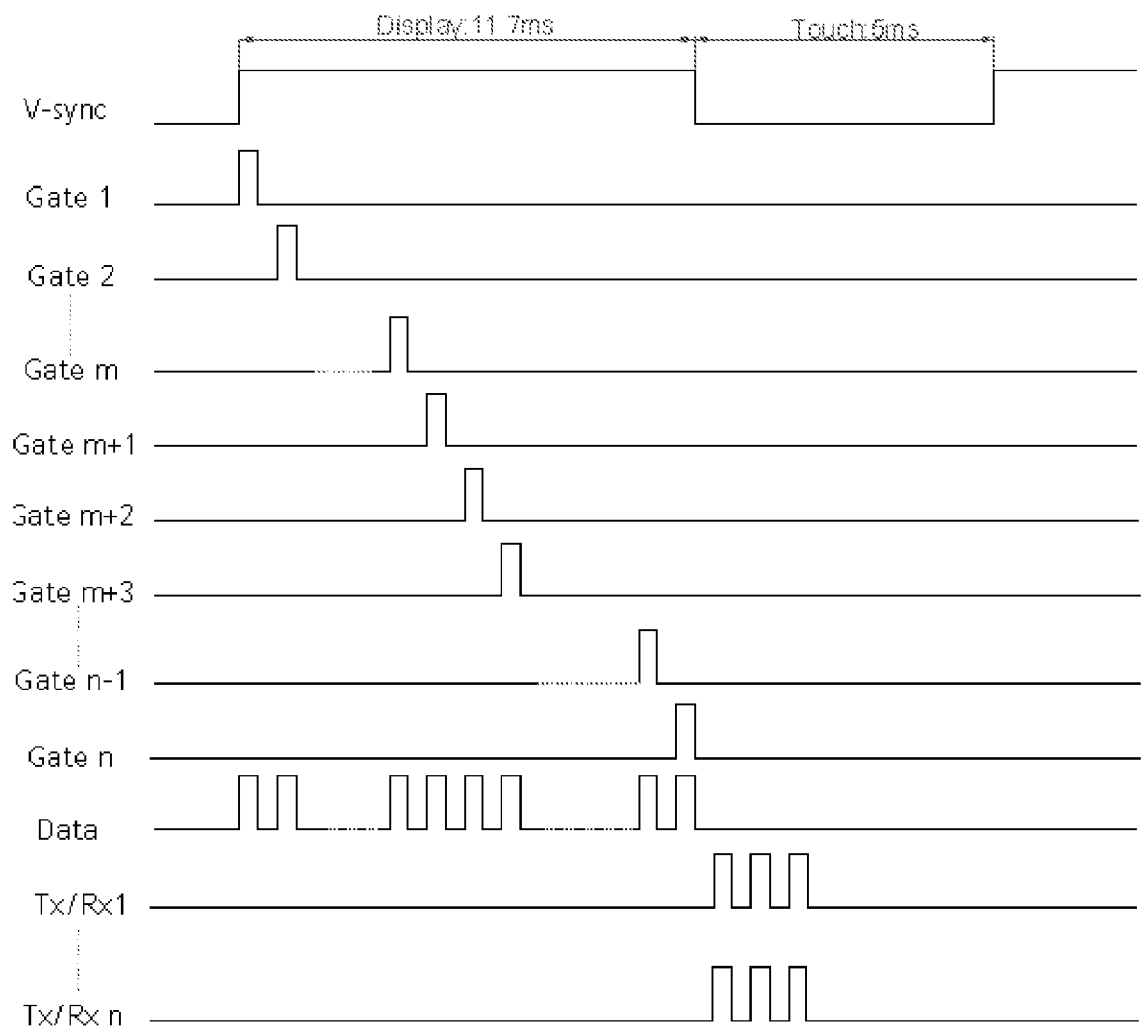

Further, as shown in FIG. 7, a driving signal may be inputted into all the touch electrodes simultaneously. In this way, each touch electrode may have more time for driving and for detecting a touch.

Fifth Embodiment

Figure 3:
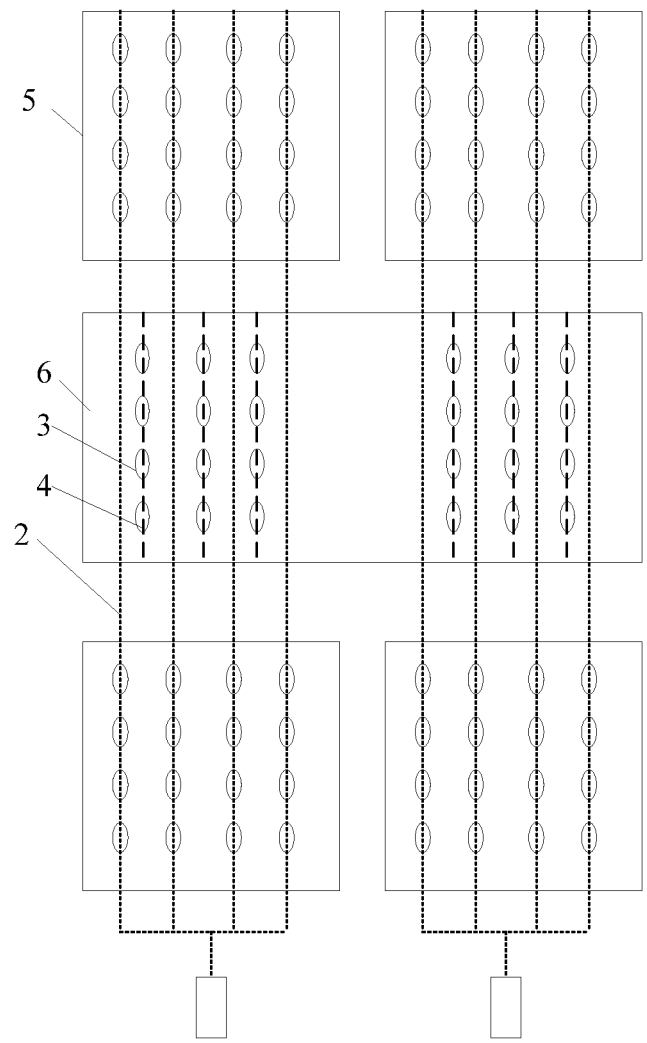
FIG. 3 is a schematic view showing the distribution of via-holes at a region where a driving electrode and a common electrode are located for an existing mutual-capacitive touch substrate.
Figure 5B:
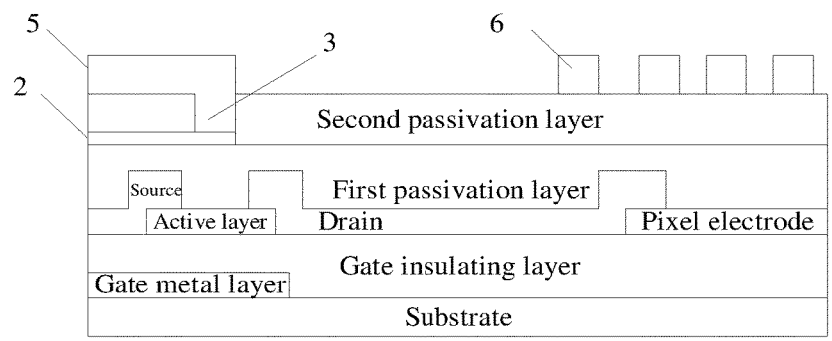

FIG. 3 shows an existing mutual-capacitive touch substrate, which includes driving electrodes 5 and common electrodes 6. In addition, sensing electrodes are arranged on a color filter substrate arranged opposite to the touch substrate to form a cell. The driving signal transmission line 2 is connected to the corresponding driving electrode 5. In order to reduce a resistance of the common electrode 6, a plurality of via-holes 3 is arranged at a region where each common electrode 6 is located, and these via-holes 3 are connected to each other via a conductive connection line 4. As shown in FIG. 5B, generally the driving electrode 5 and the common electrode 6 are located at an identical layer and made of a transparent conductive layer, and the driving signal line 2 and the conductive connection line are located at an identical layer and made of a low-resistance metal. Because the conductive connection line is located at a layer identical to the driving signal transmission line, as shown in FIG. 3, no via-hole is provided at the region where the other electrodes, e.g., the common electrodes 6, are located at a position corresponding to the driving signal transmission line 2, so as to prevent the driving signal transmission line 2 from being connected to the electrodes other than the corresponding driving electrodes via the conductive connection line. In other words, the via-holes are distributed irregularly at the regions where different touch electrodes are located, which thus results in differences between pixels, e.g., different aperture ratios, different light diffraction efficiencies, and different electric fields. As a result, the uneven display of the display panel will occur and the resultant display effect will be adversely affected.

Figure 4:
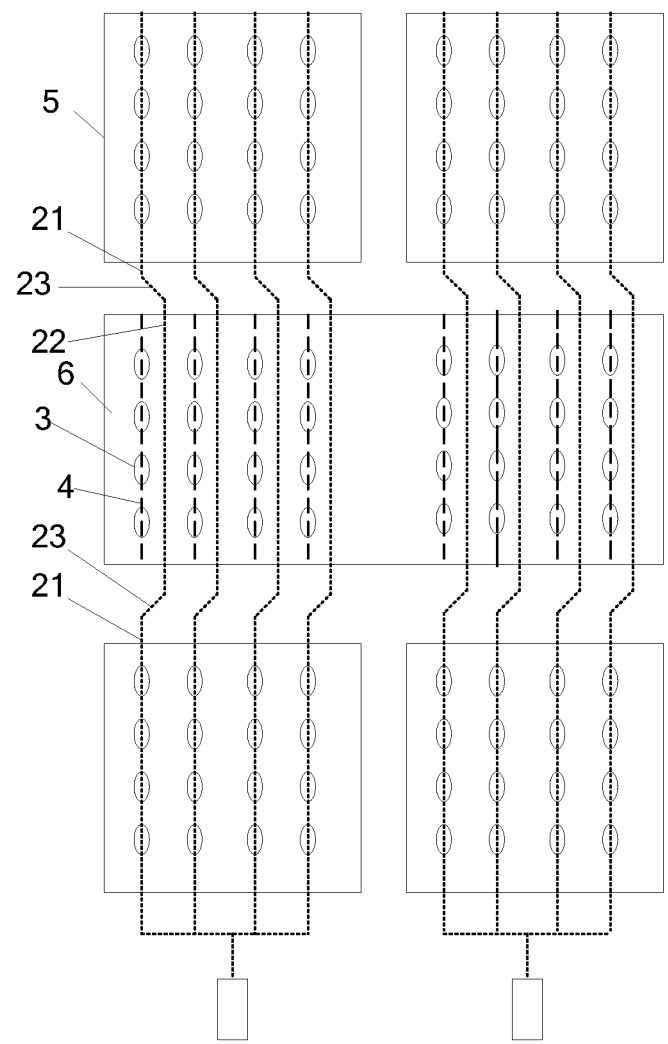
FIG. 4 is a schematic view showing the distribution of via-holes at a region where a driving electrode is located for the touch substrate according to one embodiment of the present disclosure.

In order to overcome the above-mentioned drawback, the present disclosure provides in this embodiment a mutual-capacitive touch substrate which includes, as shown in FIG. 4, a plurality of driving electrodes and a plurality of driving signal transmission lines corresponding to the plurality of driving electrodes. A region where each driving electrode is located is provided with a plurality of via-holes 3 arranged in a matrix form, at an identical amount and in an identical manner. Via-holes are arranged at a region where the common electrode is located in a manner identical to those at the region where the driving electrode is located. The driving signal transmission line 2 includes a first line 21 connected to the corresponding driving electrode 5 through the via-holes in one column, a second line 22 arranged parallel to the first line 21, and a third line 23 connecting the first line 21 and the second line 22. As shown in FIG. 4, the via-holes 3 in each column at the region where the common electrode 6 is located are connected to each other through a conductive connection line 4, so as to reduce a resistance of the common electrode 6. It can be seen that, the third line 23 is located between the driving electrode 5 and the common electrode 6 adjacent to each other and does not intersect any conductive connection line on the substrate, and the second line 22 is arranged between two conductive connection lines at adjacent columns. Alternatively, the second line 22 is arranged exactly in the middle of two conductive connection lines at adjacent columns, and separated from the two conductive connection lines at an equal distance. In this way, it is able to ensure that the second line does not intersect any conductive connection line, thereby to ensure that the driving signal transmission line is not electrically connected to the other electrodes at a region other than the region where the corresponding driving electrode is located.

To be specific, 2m conductive connection lines may be arranged at the region where each common electrode is located. Among them, the via-holes in one column are connected to each other via each of the first, third, . . . , and $(2m-1)^{th}$ conductive connection lines, and the second, fourth, . . . , and $(2m)^{th}$ conductive connection lines are not connected to the via-holes and may serve as the second lines of the driving signal transmission lines. In this way, for the driving electrodes 5, the second line of the first driving signal transmission line is just the second conductive connection line of the corresponding common electrode, the second line of the second driving signal transmission line is just the fourth conductive connection line of the corresponding common electrode, and the second line of the third driving signal transmission line is just the sixth conductive connection line of the corresponding common electrode, and so on.

According to the touch substrate in this embodiment of the present disclosure, by changing the layout of the driving signal transmission lines, it is able to enable the region where the driving electrodes and the common electrodes are located to be provided with the plurality of via-holes arranged in an identical manner in the case that the driving signal transmission line is not connected to the electrodes other than the corresponding driving electrode, and to reduce differences between the pixels, thereby to provide the even display and ensure the display effect of a display panel.

As shown in FIG. 6, the touch substrate in this embodiment may be driven in a time-division manner. A time period for displaying each frame (V-sync) by the touch panel is divided into a display period and a touch period. For example, in the sequence diagram as shown in FIG. 6, the time period for display one frame by the touch panel is 16.7 ms, the touch period includes 5 ms, and the display period includes 11.7 ms. Of course, the durations of the touch period and the display period may be adjusted appropriately in accordance with the processing capacity of an IC chip, which are not particularly defined herein. At the display period, a gate scanning signal is applied sequentially to gate signal lines Gate 1, Gate 2, . . . , and Gate n within the touch panel, and a grayscale signal is applied to a data signal line Data. At this time, the touch electrode serves as the common electrode, to which a constant common electrode signal is applied by the IC chip connected to the touch electrode, so as to achieve a display function. At the touch period, touch scanning signals T1, T2, . . . , and Tn are applied to the touch electrodes by the IC chip connected to the touch electrodes, and meanwhile, the touch electrodes detect touch sensing signals R1, R2, . . . , and Rn, so as to achieve a touch function. At the touch period, no signal is inputted into each gate signal line and the data signal line within the touch panel.

In addition, at the display period and the touch period, the common electrode signal is always applied to the common electrodes at a common electrode layer. Alternatively, at the display period the common electrode signal is applied to the common electrodes, and at the touch period the common electrodes are grounded or in a floating state where no signal is inputted.

Further, as shown in FIG. 7, a driving signal may be inputted into all the touch electrodes simultaneously. In this way, each touch electrode may have more time for driving and for detecting a touch.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A self-capacitive touch substrate, comprising a plurality of touch electrodes and a plurality of driving signal transmission lines corresponding to the plurality of touch electrodes, wherein a plurality of via-holes is arranged at an identical amount and in an identical manner at a region where each of the plurality of touch electrodes is located, each driving signal transmission line is connected to the corresponding touch electrode through the via-hole, and projections of the via-holes at the regions where the plurality of touch electrodes other than the corresponding touch electrode are located in a direction perpendicular to the substrate are not located on the driving signal transmission line,
wherein projections of the plurality of touch electrodes on the substrate are not overlapped to each other.

2. The self-capacitive touch substrate according to claim 1, wherein the region where each touch electrode is located is provided with a plurality of via-holes arranged in a matrix form,
the driving signal transmission line comprises a first line connected to the corresponding touch electrode through the via-holes arranged in a column, a second line arranged parallel to the first line and connected to a driving circuit, and a third line connecting the first line and the second line,
the other via-holes in each column at the region where the corresponding electrode is located are connected to each other via a conductive connection line,
the third line does not intersect any conductive connection line on the substrate, and
the second line is located between two conductive connection lines at adjacent columns.

3. The self-capacitive touch substrate according to claim 2, wherein the second line is separated from the two conductive connection lines at an equal distance.

4. The self-capacitive touch substrate according to claim 1, wherein the region where each touch electrode is located is provided with a plurality of via-holes arranged in a matrix form,
the driving signal transmission line comprises a first line connected to the corresponding touch electrode through the via-holes arranged in a row, a second line arranged parallel to the first line and connected to a driving circuit, and a third line connecting the first line and the second line,
the other via-holes in each row at the region where the corresponding electrode is located are connected to each other via a conductive connection line,
the third line does not intersect any conductive connection line on the substrate, and
the second line is located between two conductive connection lines at adjacent rows.

5. The self-capacitive touch substrate according to claim 4, wherein the second line is separated from the two conductive connection lines at an equal distance.

6. A display device comprising the self-capacitive touch substrate according to claim 1.

7. A mutual-capacitive touch substrate, comprising a plurality of driving electrodes, a plurality of driving signal transmission lines corresponding to a plurality of touch electrodes, and a plurality of common electrodes arranged at an identical layer with the plurality of driving electrodes, wherein a plurality of via-holes is arranged at an identical amount and in an identical manner at a region where each driving electrode or each common electrode is located, and each driving signal transmission line is connected to the corresponding driving electrode through the via-hole, projections of the via-holes at the regions where the common electrode is located in a direction perpendicular to the substrate are not located on the driving signal transmission line.

8. A display device comprising the mutual-capacitive touch substrate according to claim 7.

9. A method for manufacturing a self-capacitive touch substrate, the self-capacitive touch substrate comprising a plurality of touch electrodes and a plurality of driving signal transmission lines corresponding to the plurality of touch electrodes, the method comprising steps of:
forming the plurality of driving signal transmission lines and a plurality of conductive connection lines on the substrate with thin film transistors (TFTs);
forming a passivation layer including a region where the plurality of touch electrodes is located on the substrate with the plurality of driving signal transmission lines and the plurality of conductive connection lines, the region where each of the plurality of touch electrodes is located being provided with a plurality of via-holes arranged at an identical amount and in an identical manner; and forming at the passivation layer the plurality of touch electrodes corresponding to the region where the plurality of touch electrodes is located, each driving signal transmission line being connected to the corresponding touch electrode through the via-hole, and projections of the plurality of via-holes at the region where the plurality of touch electrodes other than the corresponding touch electrode are located in a direction perpendicular to the substrate being not located on the driving signal transmission line.

10. The method according to claim 9, wherein the region where each touch electrode is located is provided with a plurality of via-holes arranged in a matrix form, and the step of forming the driving signal transmission lines and the conductive connection lines comprises:

forming the driving signal transmission line including a first line connected to the corresponding touch electrode through the via-holes in one column, a second line arranged parallel to the first line and connected to a driving circuit, and a third line connecting the first line and the second line, and forming the conductive connection line connecting the other via-holes in each column at the region where the corresponding touch electrode is located, the third line not intersecting any conductive connection line on the substrate, and the second line being located between two conductive connection lines at adjacent columns.

11. The method according to claim 10, wherein the step of forming the second line comprises forming the second line separated from the two conductive connection lines at an equal distance.

12. The method according to claim 9, wherein the step of forming the driving signal transmission lines and the conductive connection lines comprises:

forming the driving signal transmission line including a first line connected to the corresponding touch electrode through the via-holes in one row, a second line arranged parallel to the first line and connected to a driving circuit, and a third line connecting the first line and the second line, and forming the conductive connection line connecting the other via-holes in each row at the region where the corresponding touch electrode is located, the third line not intersecting any conductive connection line on the substrate, and the second line being located between two conductive connection lines at adjacent rows.

13. The method according to claim 12, wherein the step of forming the second line comprises forming the second line separated from the two conductive connection lines at an equal distance.

* * * * *